2,816,815
Patented Dec. 17, 1957

2,816,815

PROCESS FOR SEPARATING VALUES OF TITANIUM FROM COLUMBIUM AND TANTALUM VALUES

John R. Ruhoff and George L. Martin, Webster Groves, and James W. Pollock, St. Louis, Mo., assignors to Mallinckrodt Chemical Works, St. Louis, Mo., a corporation of Missouri No Drawing. Application February 16, 1955, Serial No. 488,706

5 Claims. (Cl. 23—17)

This invention relates to a separation process and more particularly to a process for separating values of titanium from columbium and tantalum values.

Briefly, the present invention is directed to the method of separating titanium values from columbium and/or tantalum values which comprises treating a mixture of oxygen-containing compounds of titanium and columbium and/or tantalum with substantially anhydrous hydrogen fluoride at elevated temperatures to volatilize titanium as its fluoride.

Among the several objects of the invention may be noted the provision of methods for separation of values of titanium from columbium and/or tantalum values; the provision of methods for separating titanium values from columbium and/or tantalum values which employ only inexpensive and readily available reagents; and the provision of such methods which are effective in the treatment of minerals containing a large proportion of titanium compounds. Other objects and features will be in part apparent and in part pointed out hereinafter.

The invention accordingly comprises the methods hereinafter described, the scope of the invention being indicated in the following claims.

Some ore deposits containing columbium and tantalum compounds also contain substantial amounts of titanium compounds and may contain compounds of other elements from group IV B of the periodic table. Euxenite, for example, may be described as a rare earth columbate in which the columbium is partially replaced by tantalum and titanium. In certain deposits of this mineral, the proportion of titanium may nearly equal the proportion of columbium and tantalum. Before the various metallic values in such a mineral can be separated and recovered, the chemical compounds of titanium, columbium and tantalum must first be decomposed, usually with a strong alkali or acid. It has been known that these minerals could be decomposed with aqueous hydrofluoric acid and the titanium, tantalum and columbium fluorides separated as a group from the rare earths and other similar elements which form insoluble compounds with hydrofluoric acid, and that columbium values can be separated from tantalum values by fractional crystallization of the potassium salts of their fluocomplexes. Such prior processes are fairly satisfactory if the titanium content of the mineral is low, but considerable difficulties are encountered when such processes are applied to minerals containing a large proportion of titanium.

In accordance with the present invention, it has been found that minerals containing columbium and/or tantalum compounds associated with titanium compounds can be decomposed with gaseous hydrogen fluoride in a suitable reactor under conditions such that there is substantial separation of the titanium values from the columbium and/or tantalum values. The titanium values are recovered separately from the columbium and tantalum values in the form of the volatile fluoride of titanium which may be collected in a suitable condenser. After the titanium values have been removed, columbium and tantalum fluorides can be volatilized and recovered using the same or a second condenser, while the rare earths and similar elements remain in the nonvolatile residue. This is surprising because columbium and tantalum fluorides are somewhat more volatile than titanium fluoride, although the difference is not great enough to suggest that any considerable separation could be attained in this manner.

In a specific embodiment of the present invention, an ore, such as euxenite, from which titanium values are to be removed is placed in a suitable reactor made from an acid-resistant metal or other material, such as Monel metal. The reactor is equipped with means for introducing gaseous hydrogen fluoride through an inlet at one end, and an outlet at the other through which the excess hydrogen fluoride and volatilized metallic fluorides are removed. The outlet leads to a condenser in which the volatile fluorides are cooled and collected. The condenser is provided with means for periodic removal of the collected fluorides. The ore is heated at a temperature above 300° C., preferably 300–350° C., while hydrogen fluoride is passed through the reactor and titanium fluoride is collected in the condenser until the amount of tantalum and columbium being volatilized becomes appreciable. The titanium fluoride collected up to that point is removed from the condenser. The process is then continued until substantially all of the titanium has been volatilized from the ore, increasing the temperature to 450–500° C., if necessary, in order to decompose any ilmenite or other relatively stable titanium compounds which may be present in the ore. This mixture of titanium, columbium and tantalum fluorides is then removed from the condenser and may be used along with additional ore as starting material for a subsequent run. Finally, the process is continued to remove substantially all of the remaining columbium and tantalum values from the ore, increasing the temperature above 550° C. if necessary.

The formation of the fluorides of titanium, columbium and tantalum from their oxides can be represented by the following equations, which are cited by way of illustration and not in a limiting sense:

$$TiO_2 + 2HF = TiOF_2 + H_2O$$
$$TiOF_2 + 2HF = TiF_4 + H_2O$$

$$Cb_2O_5 + 6HF = 2CbOF_3 + 3H_2O$$
$$CbOF_3 + 2HF = CbF_5 + H_2O$$

$$Ta_2O_5 + 6HF = 2TaOF_3 + 3H_2O$$
$$TaOF_3 + 2HF = TaF_5 + H_2O$$

It will be seen from the above equations that considerable quantities of water are produced along with the volatile fluorides and, since the reactions are reversible, the amount of fluoride formed is dependent upon the concentration of water in the reaction zone. Apparently the amount of water produced with the formation of titanium fluoride is sufficiently great to retard the formation of columbium and tantalum fluorides. Then as the reaction of hydrogen fluoride with the titanium compounds nears completion, the concentration of water in the reaction zone decreases, thereby allowing the concentration of columbium and tantalum fluorides to increase. By suitable control of the process it is possible to separate a large part of the titanium and then recover substantially all of the columbium and tantalum along with the remaining titanium; or, alternatively, substantially all of the titanium can be removed along with a small amount of columbium and tantalum and the remaining columbium and tantalum can then be recovered substantially free from titanium.

In the case of minerals, such as euxenite, in which columbium, tantalum, and titanium are chemically combined with elements which do not form volatile fluorides, such as the rare earth elements and the like, it has been observed that if the temperature is kept below about 450° C., preferably 420–430° C., most of the titanium but only a small part of the columbium and tantalum can be volatilized as their fluorides. In that temperature range, it is therefore possible to effect a considerable separation of titanium values from columbium and tantalum values by heating the mineral until further loss in weight is negligible. The remaining columbium and tantalum compounds, which may still contain a small amount of titanium, can then be volatilized in the form of their fluorides by raising the temperature, preferably above 500° C. It appears that the rare earths and like elements form relatively stable compounds with columbium and tantalum which are only very slowly decomposed by hydrogen fluoride at temperatures below about 450° C.

While titanium compounds are generally more easily converted to titanium fluoride than columbium and tantalum compounds, ilmenite ($FeTiO_3$) appears to be an exception to this rule. If present in a mineral such as euxenite, it is only partially decomposed, if at all, at temperatures below about 450° C. and titanium present in this form is not therefore removed at lower temperatures along with the other titanium.

An excess of hydrogen fluoride over that required for formation of the volatile fluorides is preferably used to drive the reaction to completion and to sweep the volatile fluorides from the reaction zone into the condenser. This excess hydrogen fluoride can then be recovered and dried for reuse using methods already known in the art. The condensed metallic fluorides can also be treated to recover hydrogen fluoride, for example, by hydrolyzing them with steam to form their oxides and thereafter recovering and drying the hydrogen fluoride. If desired, the hydrogen fluoride used in the process may be diluted with dry air or other unreactive gas to conserve the amount of hydrogen fluoride passed through the reactor.

As will be seen from the above, the process of the present invention may be operated over a wide range of temperatures and other conditions. For example, titanium fluoride may be volatilized at temperatures above 250° C. and collected until it begins to contain significant amounts of columbium and tantalum fluorides to obtain a titanium fluoride fraction substantially free from columbium and tantalum. The process may then be continued until substantially all of the titanium is volatilized, and the mixture of titanium, columbium and tantalum fluorides thus obtained may be recycled in the process. Finally, the remaining columbium and tantalum fluorides, substantially free from titanium fluoride, may be volatilized by increasing the temperature, above 500° C. if necessary. Instead of collecting the volatile fluorides in three or more fractions, only two fractions may be collected, in which case the process may be operated to obtain maximum removal of titanium values with some sacrifice in the yield of pure columbium and tantalum fluorides, or it may be operated to obtain maximum recovery of columbium and tantalum fluorides in a single fraction with some sacrifice in the removal of titanium values from the columbium and tantalum values.

While the above process is applicable to minerals as mined and to mineral concentrates produced by physical methods, it can also be used to supplement other cracking procedures. For example, the mineral may be decomposed by heating it with aqueous hydrofluoric acid, dried, and subjected to treatment with hydrogen fluoride according to the present invention in order to separate titanium values from columbium and tantalum values.

Although the primary purpose of the present process is to separate values of titanium from columbium and/or tantalum values, these values are also separated from compounds of other elements, such as those in group III B, which do not form volatile fluorides. A few remaining elements which do form volatile fluorides under the conditions of the present process, such as silicon, can be removed readily by conventional methods at a later stage in the purification of columbium and tantalum values and do not present any difficulty in the separation of these values from titanium values.

While the columbium and tantalum compounds remaining in the residue after volatilization of the titanium values can be recovered by volatilization as their fluorides, and this is usually the preferred method, it will be apparent that they can also be recovered from the residue by the usual wet processes, such as selectively leaching them as their soluble fluocomplexes from other elements which do not form soluble fluorides or fluocomplexes.

The following examples illustrate the invention.

*Example 1*

Finely ground euxenite ore (1.50 g.) which contained 19% titanium (expressed as $TiO_2$) and 25% columbium and tantalum (expressed as $(Cb,Ta)_2O_5$) was placed in a platinum container (having dimensions of 1 x 3 x 0.5 cm. so that the ratio of exposed surface to the weight of the ore was 2 cm.$^2$/g.) and heated to 410° C. over a period of 4 hours in a stream of anhydrous hydrogen fluoride. The loss in weight during this period was 0.10 g. The weight of the ore then began to decrease rapidly until a total of 0.20 g. was lost. There was no further loss in weight, even when the temperature was increased to 450° C. The residue then contained 7% titanium (expressed as $TiO_2$) and 24% columbium and tantalum (expressed as $(Cb,Ta)_2O_5$) so that under these conditions 68% of the titanium initially present and only 17% of the columbium and tantalum were volatilized as their fluorides.

*Example 2*

A mixture of oxides (1.00 g.) containing 45% titanium dioxide, 48% columbium oxide, and 7% water was heated in a stream of anhydrous hydrogen fluoride at a temperature of 335° C. After the oxyfluorides were formed, the sample lost weight at an average rate of 0.0028 g./minute, and the flow of hydrogen fluoride was stopped when the loss in weight was equal to the weight of titanium dioxide in the initial mixture. The residue (0.55 g.) contained 3% titanium (expressed as $TiO_2$) and 83% columbium (expressed as $Cb_2O_5$) so that 96% of the titanium and 18% of the columbium initially present were volatilized under these conditions, as their fluorides.

*Example 3*

A finely ground oxide mixture (1.02 g.), which initially contained 49% columbium oxide, 49% tantalum oxide, and 2% water, was heated at 535° C. in an atmosphere of hydrogen fluoride until it lost 48% of its weight. After the treatment, the residue (0.53 g.) contained 50% columbium oxide and 42% tantalum oxide, so that 48% of the columbium and 56% of the tantalum were volatilized under these conditions, as their fluorides.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

We claim:

1. The method of separating titanium values from values of an element selected from the group consisting of columbium and tantalum, comprising treating a mixture of oxygen-containing compounds of at least one of said elements and titanium with substantially anhydrous hydrogen fluoride at a temperature not less than approximately 250° C. to volatilize titanium as its fluoride, and thereby separate said titanium fluoride from an oxygen-containing compound of at least one of said elements.

2. The method of separating titanium values from values of an element selected from the group consisting of columbium and tantalum, comprising treating a mixture of oxygen-containing compounds of at least one of said elements and titanium with substantially anhydrous hydrogen fluoride at a temperature between approximately 250–450° C. to volatilize titanium as its fluoride, and thereby separate said titanium fluoride from an oxygen-containing compound of at least one of said elements.

3. The method of separating titanium values from columbium and tantalum values, comprising treating euxenite ore with substantially anhydrous hydrogen fluoride at a temperature between approximately 250–450° C. to volatilize titanium as its fluoride, and thereby separate said titanium fluoride from an oxygen-containing compound of at least one of said elements.

4. The method of separating titanium values from columbium and tantalum values, comprising treating euxenite ore with substantially anhydrous hydrogen fluoride at a temperature between approximately 420–430° C. to volatilize titanium as its fluoride, and thereafter treating the residue with an additional amount of substantially anhydrous hydrogen fluoride at a temperature between approximately 500–550° C. to volatilize the columbium and tantalum as their fluorides.

5. The method of separating titanium values from values of an element selected from the group consisting of columbium and tantalum, comprising treating a mixture of oxyfluorides of at least one of said elements and titanium with substantially anhydrous hydrogen fluoride at a temperature of approximately 335° C. to volatilize titanium as its fluoride.

References Cited in the file of this patent
UNITED STATES PATENTS 2,602,725    Wilhelm et al. _____ July 8, 1952

OTHER REFERENCES

Lange's Handbook of Chemistry, 1944 ed., pages 182–188; 250–251; 254–255, published by Handbook Publishers Inc., Sandusky, Ohio.

"Titanium" by William M. Thornton, Jr., 1927 ed., pages 115, 116. The Chemical Catalog Co., Inc., N. Y.

"Titanium" by J. Barksdale, 1949 ed., page 83, Ronald Press Co., New York.